(12) United States Patent
Owen et al.

(10) Patent No.: US 10,205,976 B2
(45) Date of Patent: *Feb. 12, 2019

(54) STREAM BOUNDARY MARKING FOR DYNAMIC CONTENT REPLACEMENT

(71) Applicant: Verizon Digital Media Services Inc., Dulles, VA (US)

(72) Inventors: Calvin Ryan Owen, Draper, UT (US); Fred Ross Cordova, Jr., Salt Lake City, UT (US); David Frederick Brueck, Saratoga Springs, UT (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,298

(22) Filed: Oct. 24, 2017

(65) Prior Publication Data

US 2018/0048923 A1 Feb. 15, 2018

Related U.S. Application Data

(63) Continuation of application No. 15/097,189, filed on Apr. 12, 2016, now Pat. No. 9,807,429.

(51) Int. Cl.
*H04N 7/10* (2006.01)
*H04N 21/234* (2011.01)
*H04N 21/472* (2011.01)
*H04N 21/61* (2011.01)
*H04N 21/845* (2011.01)
(Continued)

(52) U.S. Cl.
CPC ....... *H04N 21/23424* (2013.01); *G11B 27/10* (2013.01); *G11B 27/102* (2013.01); *H04N 21/2387* (2013.01); *H04N 21/2407* (2013.01); *H04N 21/47202* (2013.01);
(Continued)

(58) Field of Classification Search
CPC . H04N 21/4331; H04N 21/458; H04N 21/812
See application file for complete search history.

(56) References Cited

U.S. PATENT DOCUMENTS 8,752,085 B1 * 6/2014 Brueck ................ H04L 65/601
725/32
2010/0017820 A1 1/2010 Thevathasan et al.
(Continued)

*Primary Examiner* — Gigi L Dubasky
(74) *Attorney, Agent, or Firm* — Ansari Katiraei LLP; Arman Katiraei; Sadiq Ansari

(57) ABSTRACT

The implementation provides for controlled dynamic content replacement within media content. The media content is encoded in its original form with markers marking segments for time or condition triggered replacement. Each marker is provided a type. A request link is generated for requesting the media content. The link encodes control data for the different marker types. In response to a media content request, the server scans encoded chunks of the media content for markers. From the request link, the server obtains the control data for an identified marker type and determines whether to replace the content based on triggering of the control data. This allows advertising content to remain as part of the media content until reaching a certain number of impressions or a certain time. Thereafter, the content is dynamically replaced with temporally relevant content or other content from an ongoing campaign during real-time media content playback.

19 Claims, 7 Drawing Sheets

(51) Int. Cl.
  *H04N 21/2387*  (2011.01)
  *G11B 27/10*  (2006.01)
  *H04N 21/24*  (2011.01)
  *H04N 21/81*  (2011.01)
  *H04N 21/6379*  (2011.01)

(52) U.S. Cl.
  CPC ..... *H04N 21/6125* (2013.01); *H04N 21/6379* (2013.01); *H04N 21/812* (2013.01); *H04N 21/8456* (2013.01)

(56) References Cited

U.S. PATENT DOCUMENTS

| | | | |
|---|---|---|---|
| 2012/0137015 A1* | 5/2012 | Sun | H04N 21/26258 709/231 |
| 2012/0166289 A1* | 6/2012 | Gadoury | G06Q 30/0269 705/14.66 |
| 2015/0106841 A1* | 4/2015 | Wolf | H04N 21/812 725/32 |

* cited by examiner

STREAM BOUNDARY MARKING FOR DYNAMIC CONTENT REPLACEMENT

CLAIM OF BENEFIT TO RELATED APPLICATIONS

This application is a continuation of U.S. nonprovisional application Ser. No. 15/097,189 entitled "Stream Boundary Marking for Dynamic Content Replacement", filed Apr. 12, 2016. The contents of application Ser. No. 15/097,189 are hereby incorporated by reference.

BACKGROUND ART

Online and over-the-top (OTT) media delivery provides content providers more direct means to reach users or viewers than traditional media broadcasting. With online and OTT delivery, content providers can customize content and advertisements presented with the content for different users, which in turn, allows content providers to better monetize their content.

In the traditional broadcast model, advertising campaigns were defined with timed slots at which the advertisement was to air in exchange for certain pricing, wherein the pricing was based on the expected viewership at each time slot. The campaign would be complete after airing the advertisement at the time slots regardless of the actual viewership. With online and online and OTT delivery, advertising campaigns can now be defined more granularly and can be customized dynamically.

On-demand playback of the online or OTT delivered content has also created additional opportunities for content monetization. Viewers are no longer relegated to the distributor airing schedule. With on-demand playback, viewers can view content when and where they want. Thus, each subsequent on-demand playback is an opportunity to obtain additional advertisement impressions in order to complete an existing advertising campaign or to commence a new one.

However, in some cases, the on-demand content is a recording or copy of the original content. The on-demand content includes the same advertisements that were presented with the original presentation of the content. For the monetization reasons discussed above, there is a need to replace advertisements in the on-demand content, but to do so in a controlled manner. In particular, there is a need to replace advertisements for certain users while retaining the original advertisements for other users. There is a need to replace advertisements that have received a specified number of impressions in satisfaction of the corresponding advertising campaigns. There is also a need to replace advertisements that become stale or obsolete after a certain passage of time from when the content was first presented. For example, advertisements may be used to promote upcoming content or provide notification of upcoming events. In such cases, the advertiser may want as many impressions up to a certain point in time after which the advertisements have no value.

In other words, there is a need to retain the original form of the media content for some time and control the partial content (e.g., advertisement) replacement such that the replacement does not occur randomly or dynamically with each playback. More specifically, there is a need to control the partial content replacement to account for certain timing or campaign criteria. There is a need to embed or incorporate the criteria with the on-demand content and trigger the partial content replacement once the timing or campaign criteria has been satisfied.

BRIEF DESCRIPTION OF THE DRAWINGS

A preferred embodiment of methods and systems for stream boundary marking for dynamic content replacement will now be described, by way of example only, with reference to the accompanying drawings in which.

DETAILED DESCRIPTION

To aid in the discussion that is to follow, media content refers to digital content with a temporal duration. Media content can include video, audio, a sequence of text, a sequence of images, a service, or any combination thereof. Media content can be composed of multiple media elements. For instance, media content can be formed with primary video content that is broken up into different segments separated by breaks during which advertisements or other third party content is presented.

Provided are methodologies and systems for marking arbitrary boundaries within media content. The boundaries enable the media content to be encoded in its original form while still providing controlled server-side replacement of content within marked boundaries during linear or on-demand playback. Conditions may be specified for the marked boundaries or different links may be used to request the media content. The conditions or links control the server-side replacement of the content between the marked boundaries. Marked boundary content can be skipped over, replaced with slate content, or replaced with temporally relevant content or other content from an ongoing campaign during real-time playback of the media content.

The controlled dynamic content replacement applies to linear (i.e., live) or on-demand media content distribution. Boundary content replacement during linear media content distribution can be used to send the media content in its original form to one set of users while sending the media content with replaced segments to a different set of users. In this manner, a media generation system can send the media content in its original form to users in a first region or country while simultaneously sending the media content with advertisements or other segments customized for users in a second region or country. Similarly, slate content can be used to replace segments within marked boundaries that are to be blacked out in certain regions. Boundary content replacement within on-demand content facilitates the ability to present media content in its original form for some period of time or until some condition is met. Thereafter, advertisements and other segments within different marked boundaries can be skipped over or replaced with content that is temporally relevant or part of new campaigns.

In some embodiments, the boundary markers are added when a content provider provides the media content to a media generation system of some embodiments for encoding and subsequent distribution on behalf of the content provider. A content provider uses an application programming interface (API), script, or configuration file to set the boundary markers within the media content prior to the media content encoding.

Figure 1:
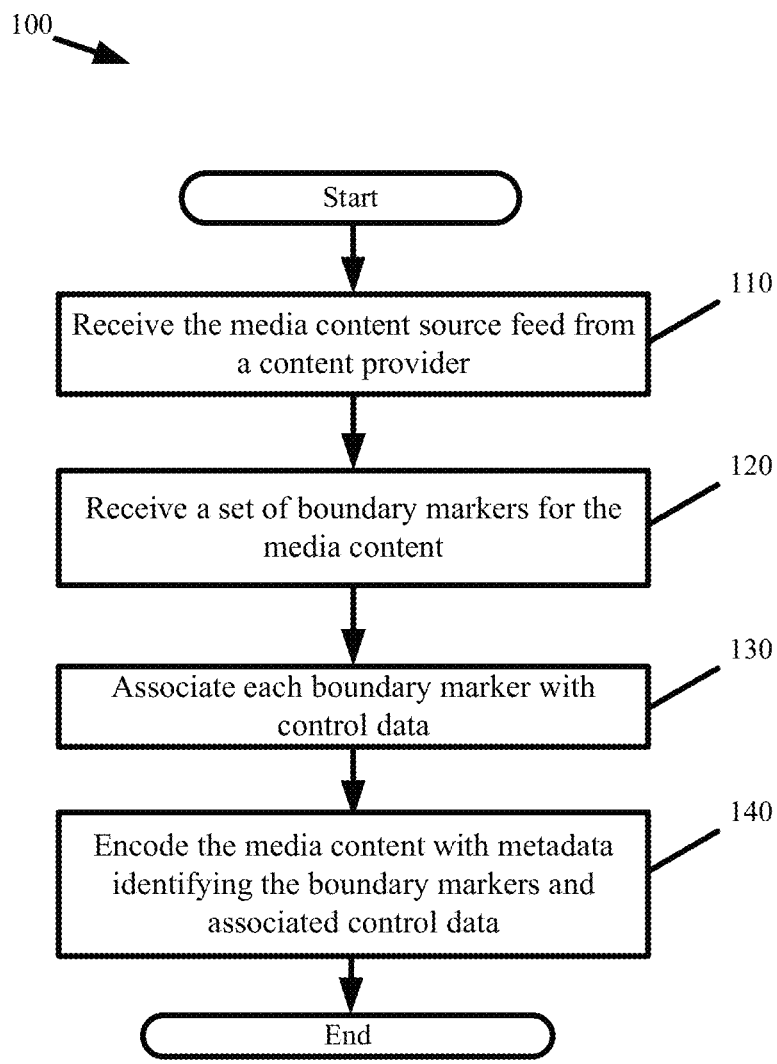
FIG. 1 presents a process for encoding media content with a set of marked boundaries in accordance with some embodiments.
Figure 6:
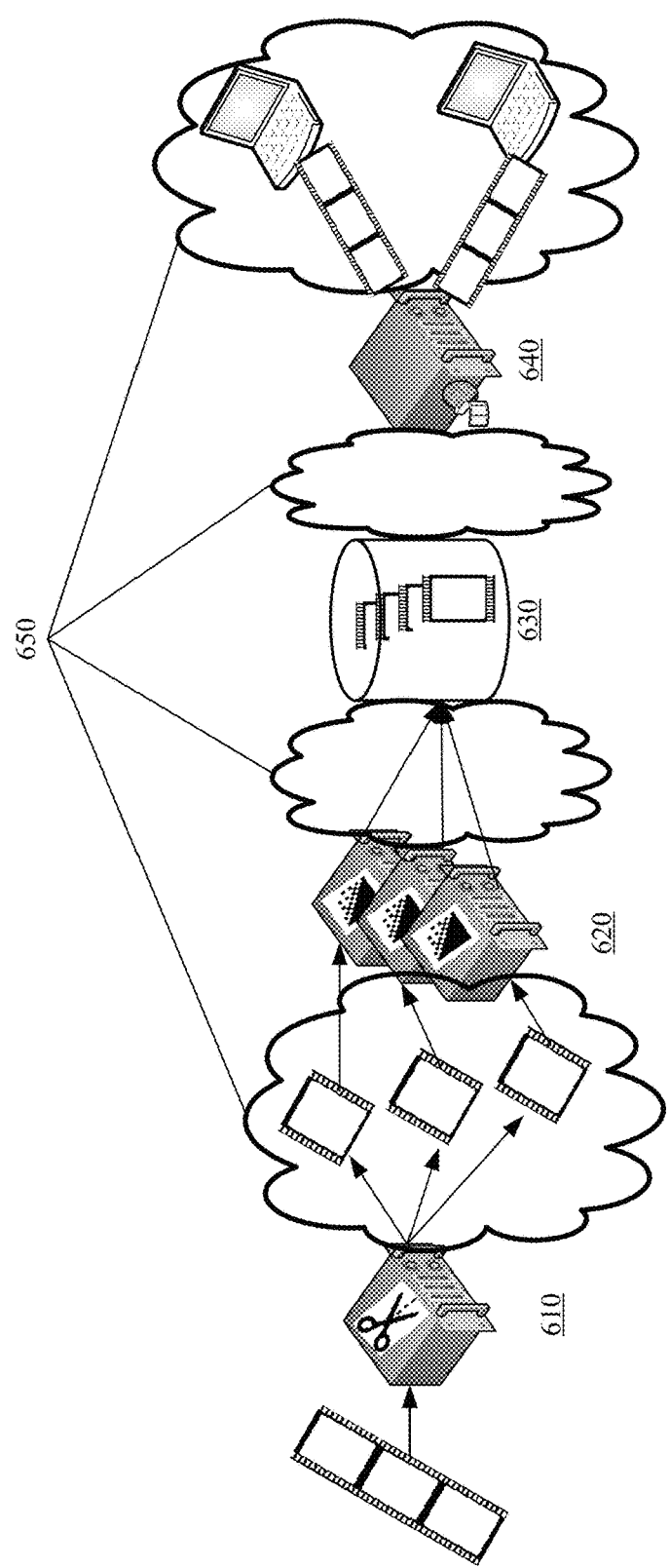
FIG. 6 is a block diagram of an exemplary media generation system for encoding media content into a sequence of slices and for dynamically replacing slices based on the boundary markers during distribution.

FIG. 1 presents a process 100 for encoding media content with a set of marked boundaries in accordance with some embodiments. Process 100 is performed by a media generation system. The media generation system can be a stand-alone machine or a set of machines. The media generation system machines can be part of a content delivery network, hosting provider, or other cloud-based platform for distributing content. FIG. 6 below illustrates various components of the media generation system of some embodiments.

The process commences by receiving (at 110) the media content source feed from a content provider. The source feed can originate from a digital video camera, a broadcast signal, a stream, or a media file. The content provider provides the media content to the media generation system over a digital network, such as the Internet. The content provider may provide the media content as part of a live stream that the media generation system is to distribute while simultaneously creating a stream copy for on-demand distribution. Alternatively, the content provider may provide the media content solely for on-demand distribution.

The process further receives (at 120) a set of boundary markers for the media content. The content provider can set one or more boundary markers so long as the start and end markers of different boundaries do not overlap. The boundary markers are specified relative to the media content timing. For instance, if the media content runs between zero and ten minutes, a boundary start marker is defined within that ten minute duration with a corresponding boundary end marker defined at some later point in time that does not extend past the ten minute mark. The boundary end marker can be defined as a duration from the boundary start marker. If the content provider does not know the boundary duration, the content provider sets the boundary start marker time separate from the boundary end marker time. More specifically, upon reaching a video frame corresponding to the boundary start, the content provider issues an API call to the media generation system setting the boundary start marker at that video frame. Then, upon reaching a subsequent video frame corresponding to the boundary end, the content provider issues an API call to the media generation system setting the boundary end marker at that subsequent video frame.

The process associates (at 130) each boundary marker with control data. In some embodiments, the control data includes a type definition. The type definition classifies the content within a marked boundary. The type definition can be any arbitrary identifier provided by the content provider. Thus, markers of different types can be defined for the same or different media content. In some embodiments, the control data associates conditions or timing with each defined type. In some other embodiments, the conditions or timing for controlling boundary marked content is managed by the content provider.

Figure 2:
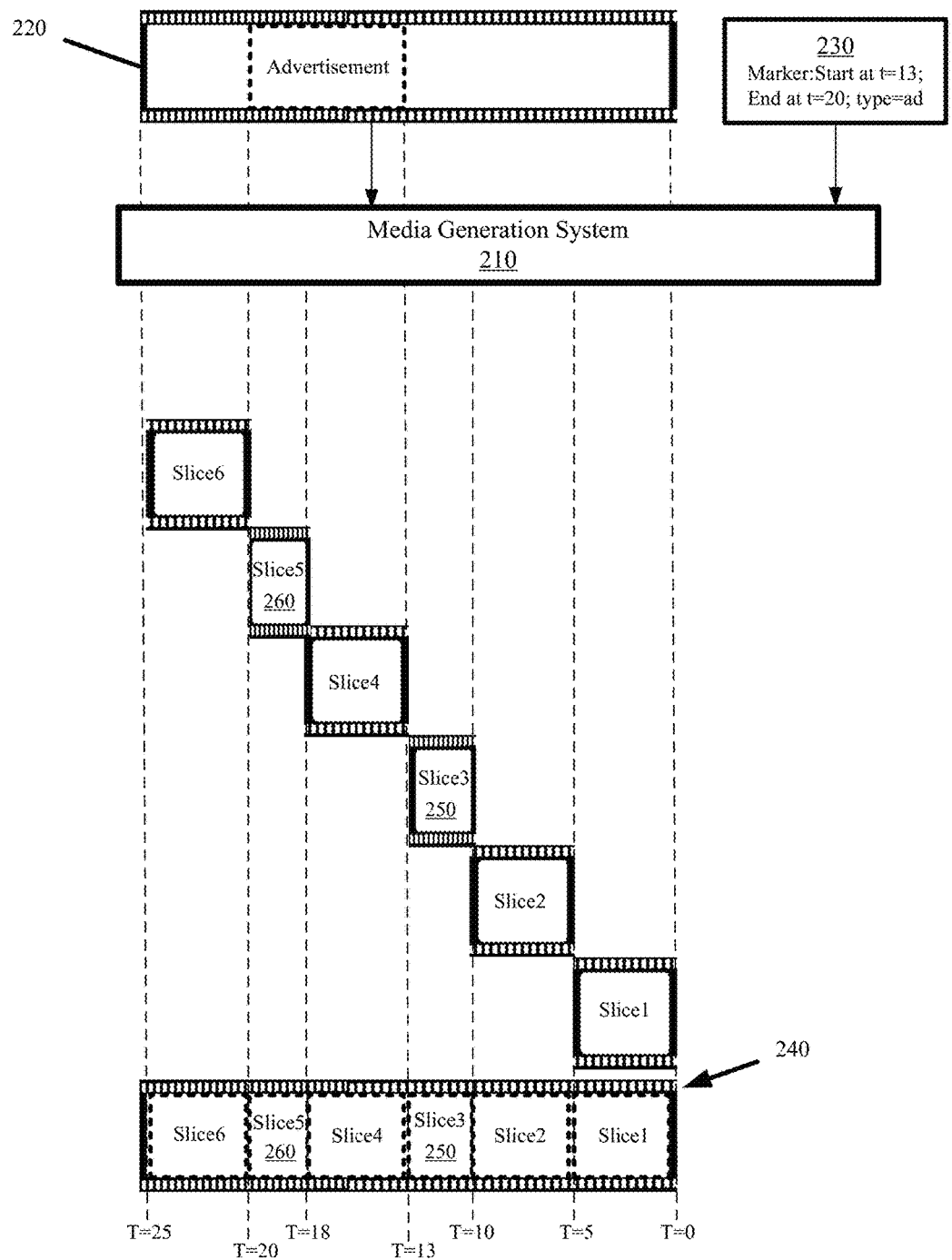
FIG. 2 conceptually illustrates modifying media content encoding because of boundary marker definitions in accordance with some embodiments.

The process encodes (at 140) the media content according to the boundary markers and associated control data. The encoding involves converting the media content into a digital format of one or more protocols and bit rates. The encoding also involves generating media content metadata with the boundary markers, and more specifically, the boundary marker control data at the designated boundary start and end times. The metadata can be stored separate from the one or more encoded media content files or can be embedded in headers of the encoded media content files. In some embodiments, the boundary marker definition affects how the media generation system encodes the media content. FIG. 2 conceptually illustrates modifying media content encoding because of boundary marker definitions in accordance with some embodiments.

FIG. 2 illustrates the media generation system 210 of some embodiments receiving a media content source feed 220 from a content provider along with a boundary marker definition 230 setting a boundary start marker, a boundary end marker, and a boundary type. The media generation system 210 partitions the media content into several slices 240.

Each slice represents a temporal chunk of the media content. In other words, each slice constitutes some number of consecutive media content frames. The slicing creates slices that are of equal duration (i.e., five seconds in duration) except for slices 250 and 260, wherein the slice 250 is the last slice before the boundary start marker and the slice 260 is the last slice before the boundary end marker. In particular, the slicing partitions a duration straddling both sides of a boundary marker such that content falling outside the boundary marker is contained in a separate slice than content falling inside the boundary marker. Consequently, the slice 250 immediately preceding the boundary start marker is cut short at the boundary start marker so that the slice 250 does not include any media content frames falling within the marked boundaries. Similarly, the last slice 260 for the boundary marked content is cut short at the boundary end marker so that the slice 260 does not include any media content frames that extend past the boundary end marker.

Assuming that the boundary marked content represents third party content, such as an advertisement, that is different than the primary video content, the primary video content is partitioned into a first set of slices and a second set of slices with the third party content within the marked boundary encoded as a third set of slices in between the first set of slices and the second set of slices. The third set of slices has no overlapping frames with the first set of slices or the second set of slices. The third set of slices includes frames of just the third party content. The slices are then distributed to one or more encoders of the media generation system 210 for encoding. When using multiple encoders, different slices of the media content can be encoded simultaneously.

In response to user requests for the encoded media content, the media generation system disseminates the encoded content and dynamically replaces content within the marked boundaries where conditions or triggers associated with the replacement have been satisfied. In some embodiments, the content providers monitor the conditions or triggers associated with the replacement of different typed boundaries. The content provider then controls the dynamic content replacement performed by the media generation system by issuing different links with which users can request the media content from the media generation system.

These links modify server-side operation by controlling the media generation system replacement of the content within the marked boundaries before serving the content to the requesting users.

In preferred embodiments, the links are Uniform Resource Locators (URLs). Each URL specifies the domain name for the media generation system tasked with the on-demand or live distribution of the encoded media content. The URL provides the path for accessing the encoded media content from the media generation system. In some embodiments, the URL specifies one or more filenames corresponding to the encoded slices. The URL also includes a boundary type and a boundary type parameter.

The URL boundary type identifies the portion of the media content that is subject to potential replacement. Stated differently, content falling between start and end markers defined to be of the same type as the URL boundary type is the content that is subject to potential replacement.

The boundary type parameter controls the media generation system action with respect to the content in between markers of the boundary type. More specifically, the parameter controls whether the media generation system replaces content within that boundary type during linear or on-demand playback. In some embodiments, the parameters controlling content replacement include "ignore_as_content", "ignore_as_ad", "replace_as_ad", and "skip". Other embodiments define other parameters that cause the media generation system to perform additional actions with respect to the content falling between the markers of a particular type.

In response to media content requests with the "ignore_as_content" parameter, the media generation system sends to requesting users, the original encoded content within a boundary that is defined to be of the same type as the parameter. In other words, the slices encoded between the start and end markers are passed without modification. A content provider inserts the "ignore_as_content" parameter in media content request URLs while a replacement condition or trigger for the boundary marked content has yet to be satisfied. For example, the content provider uses the "ignore_as_content" while timing for content within a marked boundary remains valid or while the boundary marked content has yet to reach a desired number of impressions in satisfaction of an advertisement campaign.

In response to media content requests with the "ignore_as_ad" parameter, the media generation system again sends to requesting users, the original encoded content within a boundary that is defined to be of the same type as the parameter. However, the media generation system treats the boundary marked content as an advertisement or third party content because of the parameter. In some embodiments, this differentiated treatment of the boundary marked content causes the media generation system to separately track impression counts for the boundary marked content and to report the impression counts to the content provider. Once a desired impression count is reached, the content provider can change the parameter so that the media generation system replaces the boundary marked content in response to subsequent requests with the changed parameter.

In response to media content requests with the "replace_as_ad" parameter, the media generation dynamically replaces the content within a boundary that is defined to be of the same type as the parameter. In other words, the slices encoded between the start and end markers are ignored and substitute content is sent instead.

The substitute content may be any content selected by the media generation system, a content provider, or a third party server, such as advertisement server. The substitute content need not be the same length as the boundary marked content being replaced. In some embodiments, the content provider can control the media generation system selection of the substitute content. In some such embodiments, the content provider specifies the campaign from which to retrieve the substitute content with an additional "&ad=mycampaign" parameter. For example, the request URL "example.com/<asset_id>.m3u8?ad=campaign1&boundary.c3=replace_as_ad" causes the media generation system to replace content within boundaries of the type "c3" with content from "campaign1". In some embodiments, the media generation system uses the type identifier (i.e., "c3") to retrieve relevant substitute content. The media generation system can also determine the duration between the boundary start marker and corresponding boundary end marker in order to obtain substitute content that is similar in duration as the content being replaced. In some embodiments, the media generation system uses user preferences, user agent, user Internet Protocol (IP) address, geographic region, and other qualifiers to retrieve relevant substitute content. The substitute content can be stored locally within the media generation system. The media generation system can also dynamically retrieve the substitute content from an advertisement server or other third party server.

Some embodiments further provide a "replace_as_content" parameter in addition to or instead of the "replace_as_ad" parameter. Together these parameters can be used to differentiate the selection of the substitute content. For instance, when the media generation system encounters the "replace_as_ad" parameter, it may retrieve the substitute content from one or more designated advertisement server. However, when the media generation system encounters the "replace_as_content" parameter, it may retrieve the substitute content from a different set of third party servers that provide content other than just advertisements. To reiterate, the inclusion of the "replace_as_content" parameter is optional as the selection of substitute content, whether advertisements or other assets, can be controlled with just the "replace_as_ad".

In response to media content requests with the "skip" parameter, the media generation system omits the content within a boundary that is defined to be of the same type as the parameter. For on-demand playback, the media generation system seamlessly transitions from the encoded slice before the boundary start marker to the encoded slice immediately after the boundary end marker. In other words, the slices encoded between the start and end markers are skipped and never passed to the requesting user. The duration for the skipped boundary is eliminated from playback. For linear playback, the media generation system replaces the boundary marked content with slate. In this case, the duration for the skipped boundary is preserved, albeit without presentation of the original content within the boundary.

Figure 3:
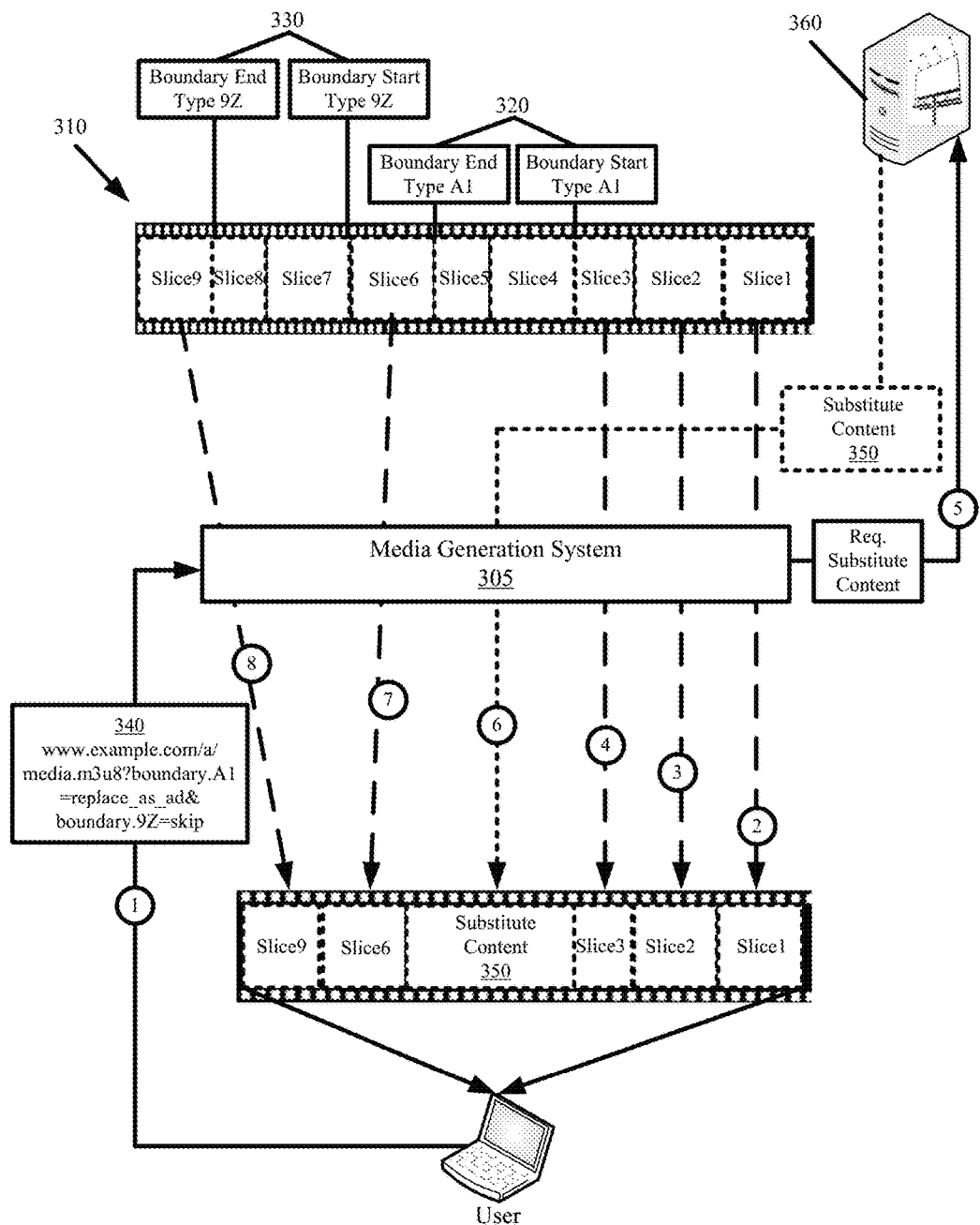
FIG. 3 conceptually illustrates the dynamic content replacement performed by the media generation system in accordance with some embodiments.

FIG. 3 conceptually illustrates the dynamic content replacement performed by the media generation system 305 in accordance with some embodiments. The dynamic content replacement in FIG. 3 is performed in response to a request for on-demand media content.

The figure illustrates encoded slices 310 of particular media content. The encoded slices 310 include a first set of slices falling in between a first marked boundary 320 of a first type and a second set of slices falling in between a second marked boundary 330 of a second type. The figure also illustrates a request URL 340 sent from a user to the media generation system 305 in order to request the particular media content. The media request URL specifies parameter "replace_as_ad" for the first boundary type and parameter "skip" for the second boundary type.

In response to the request URL 340, the media generation system 305 begins passing the encoded slices 310 for the particular media content to the user according to their encoding order. From the metadata in the encoded slices 310, the media generation system 305 identifies the slice corresponding to the first boundary 320 start marker.

The media generation system 305 determines what action to take for the slices falling in between the first boundary 320 by identifying the first type specified for the first boundary 320 in the metadata and by identifying the action specified for the first type in the request URL 340. The request URL 340 specifies parameter "replace_as_ad" for the first type. Accordingly, the media generation system 305 replaces the first set of slices falling within the first boundary 320 with substitute content 350. As shown, the media generation system 305 requests the substitute content 350 from a third party server 360. The third party server 360 can be an advertisement server or any content provider external to the media generation system 305. In some embodiments, the media generation system 305 locally stores copies of different substitute content. The substitute content 350 need not be an exact temporal match for the first set of slices being replaced. However, the media generation server 305 can provide the first type, a duration, an identifier for a particular campaign, user preferences, geographic information, or other qualifying parameters to the third party server 360 in order to obtain relevant substitute content 350.

After replacing the first boundary 320 slices with the substitute content 350, the media generation system 305 continues to send the original encoded slices from the particular media content 310 immediately following the first boundary 320 to the user. The media generation system 305 continues in this fashion until identifying an upcoming slice corresponding to the second boundary 330 start marker from the metadata. Here again, the media generation system 305 determines what action to take for the slices falling in between the second boundary 330 by identifying the second type specified for the second boundary 330 in the metadata and by identifying the action specified for the second type in the request URL 340. The request URL 340 specifies parameter "skip" for the second type. Accordingly, the media generation system 305 does not send the second set of slices falling in between the second boundary 330 to the user. Instead, the media generation system 305 seeks to the slice immediately following the last slice falling within the second boundary 330 end marker, and continues to send the particular media content 310 from that slice.

It should be noted that the media generation system 305 performs the content replacement and skipping without the need to decode or re-encode the original media content. Moreover, the content replacement and skipping is performed in real-time and in response to a user request with the original media content being encoded with all original components including advertisements or other third party content.

Figure 4:
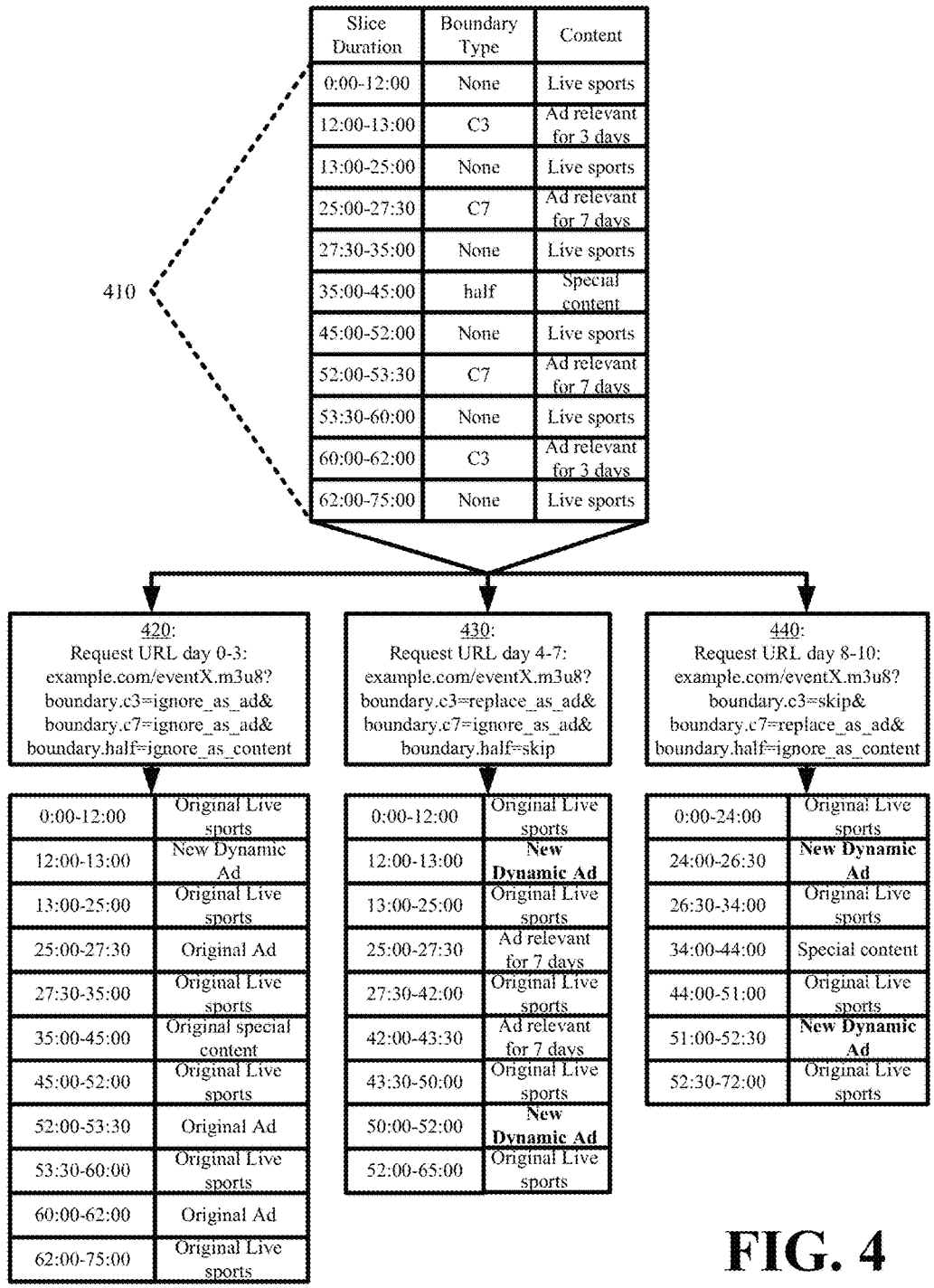
FIG. 4 illustrates controlling the dynamic content replacement by changing the request URLs in accordance with some embodiments.

FIG. 4 illustrates controlling the dynamic content replacement by changing the request URLs in accordance with some embodiments. The figure illustrates encoded slices 410 produced from an original presentation of a sporting event. In particular, the figure illustrates duration, any boundary markers, types for specified boundary markers, and content elements associated with each slice of the original media content 410. In this figure, marked boundaries differentiate one or more slices for the live event from one or more slices for a first set of advertisements that are relevant for three days after the original presentation, one or more slices for a second set of advertisements that are relevant for seven days after the original presentation, and one or more slices for special halftime content. FIG. 4 further illustrates controlling the dynamic replacement of the content based on three different URLs 420, 430, and 440 from which users can request playback of the sporting event.

The first URL 420 is provided to allow users access to view the sporting event for up to three days after the sporting event original presentation. In response to the first URL 410 and the control parameters for the marked boundaries specified therein, the media generation system (not illustrated) provides the sporting event in its original form including the original advertisements and the original special halftime content.

The second URL 430 is provided to allow users access to view the sporting event between four and seven days after the sporting event original presentation. In response to the second URL 430 and the different control parameters for the marked boundaries specified therein, the media generation system provides the original live portions of the sporting event, replaces the first set of advertisements with new dynamic advertisements, provides the original second set of advertisements, and skips the special halftime content. But for removal of the special halftime content, the media generation system maintains the presentation ordering of the live portions of the sporting event and the advertisements.

The third URL 440 is provided to allow users access to view the sporting event between eight and ten days after the sporting event original presentation. In response to the third URL 440 and the different control parameters for the marked boundaries specified therein, the media generation system provides the original live portions of the sporting event and the special halftime content, skips the first set of advertisements, and replaces the second set of advertisements with new dynamic advertisements. But for removal of the first set of advertisements, the media generation system maintains the presentation ordering of the live portions of the sporting event, the second set of advertisements, and the special halftime content.

These three variations in the on-demand presentation of the sporting event are accomplished by simply changing one or more parameters within the request URLs 420, 430, and 440. The media generation system creates the modified content for the different request URLs 420, 430, and 440 dynamically as the requests are received without the need to decode or re-encode the original content and with the original presentation of the sporting event being originally encoded with the original first and second sets of advertisements and the special halftime content.

In the above embodiments, the content provider or media generation system controls when and what content segments are dynamically replaced by modifying the request URL parameters. In some embodiments, the content provider or media generation system can embed the conditions or triggers controlling boundary marked content segment replacement directly within the request URL. One example of such a URL is "example.com/a/mediaX.m3u8?boundary.promo=replace_as_ad:timestamp=12314313 &boundary.ad=replace_as_ad:impression=1000". In this example, the control data is specified as a key value pair. The key corresponds to one of the boundary marker types embedded in the encoded media content. The value provides the timing or condition for replacing the content within a marked boundary. The first key value pair provides control data for boundary markers of type "promo" with a timing condition for replacing the content between boundary markers of this type after a particular timestamp. The second key value pair provides control data for boundary markers of type "ad" with an impression condition for replacing the content between boundary markers of this type after reaching a particular number of impressions for the original content between the boundary markers. In order to determine whether the second key value condition is triggered, the media generation system obtains the current impression count for the content between the "ad" type boundary, wherein the current impression count can be retrieved from a database, locally cached in memory of the media generation system, retrieved from metadata, or from another advertising server or other third party server.

Figure 5:
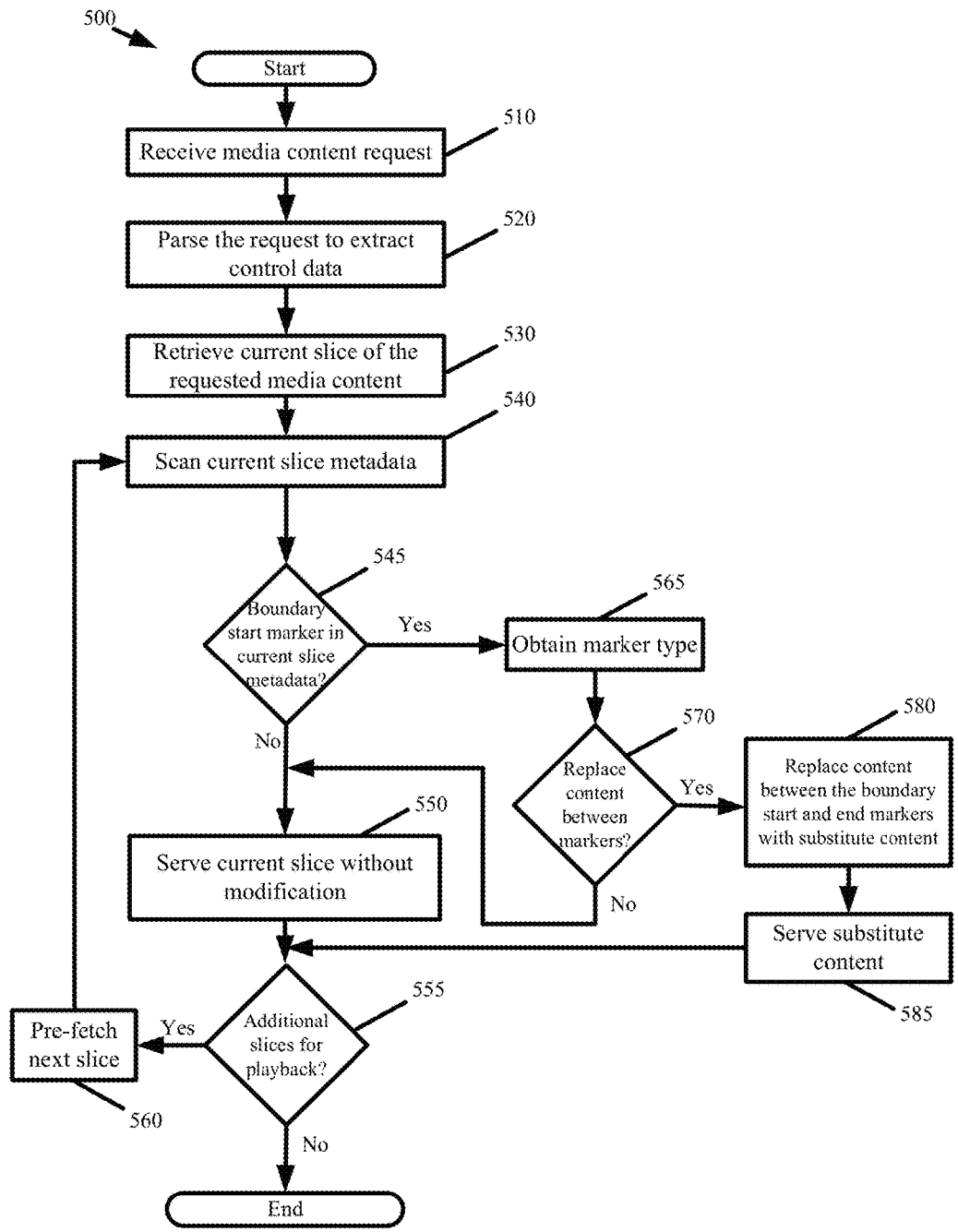
FIG. 5 presents a process for controlled dynamic content replacement performed by the media generation system during media content playback in accordance with some embodiments.

FIG. 5 presents a process 500 for controlled dynamic content replacement performed by the media generation system during media content playback in accordance with some embodiments. The process commences with the media generation system receiving (at 510) a media content request. The process parses (at 520) the request to extract the control data from the URL. Specifically, the process extracts at least a boundary type and the control parameter specified for boundaries of the extracted type. As demonstrated above, the process could also extract a condition or trigger for boundaries of the extracted type.

The process then begins serving the requested media content to the requesting user. In some embodiments, the serving involves a sequence of message exchanges. For instance, the media generation system may return a manifest in response to the original user request for media content. The manifest identifies the sequential sliced encoding of the media content and the files corresponding to the different slices in the proper order. The user's client player begins requesting the slices one by one from the media generation system according to the manifest and the server responds by passing each requested slice to the client player. In some embodiments, the user's client player requests different chunks within a slice and the media generation system responds by passing a slice in part to the user client until each chunk of the slice has been requested. In any case, the process responds to the user request by retrieving (at 530) a current slice of the requested media content. The process scans (at 540) the current slice metadata to determine (at 545) if any boundaries have been marked in the current slice. In some embodiments, the process scans each slice for boundaries while building the manifest or playlist to send to the user. In some other embodiments, the process scans each slice for boundaries as the slices are requested by the user.

If no boundary markers are present in the current slice, the process serves (at 550) the current slice to the user. The process may also monitor user playback of the slice to update an impression count for the current slice or associated content. If additional slices remain (at 555) for playback, the process waits for a next slice request or pre-fetches (at 560) the next slice in anticipation of the request before reverting to step 540. Otherwise, playback has ended and the process ends.

If a boundary marker is present in the current slice, the process obtains (at 565) the type for the marker in the current slice and determines (at 570) whether the boundary marked content is to be replaced in view of the control parameter specified for the boundary type in the request URL. As part of step 570, the process may obtain supplemental control data. For instance, the request URL control parameter may specify a condition that is triggered when a particular number of impressions have been reached for the boundary marked content. The process therefore queries a database or other data store where the impression count is stored in order to obtain the supplemental data for the control parameter.

In response to a control parameter that does not change the boundary marked content, the process moves to step 550 and serves the current slice to the user. In this case, the boundary markers effect no change to the playback. Other slices within the same boundary marked region are also served in their original encoded form without modification.

In response to a control parameter that changes the boundary marked content, the process replaces (at 580) the content between the boundary start marker and the boundary end marker with substitute content and serves (at 585) the substitute content to the user. The process may optionally update an impression count for the substitute content. The process then returns to step 555 to check for additional slices.

In some embodiments, the URL control data specifies the substitute content that replaces the original encoded content between the triggered start and end boundary markers. In some embodiments, the server intelligently selects the substitute content. The server may select substitute content that is classified to be of the same type as the boundary marked content. The server may select the substitute content to be of the same length as the boundary marked content. The server may select the substitute content based on tracked preferences of the user, the user device, geographic region, or IP address as some examples.

FIG. 6 is a block diagram of an exemplary media generation system for encoding media content into a sequence of slices and for dynamically replacing slices based on the boundary markers during distribution. The system involves at least one slicer 610, encoder 620, storage 630, and server 640, each communicably coupled via a data communications network 650 (e.g., public network such as the Internet or private network such as a local area network (LAN)).

A content provider feeds media content with boundary markings to the slicer 610. The slicer 610 partitions the media content according to the boundary definitions into a plurality of slices, wherein the partitioning according to the boundary definitions ensures that no slice spans content or frames inside and outside a marked boundary. The slicer 610 may be a lightweight piece of software that runs on the computing system near the signal source (e.g., source file or live feed), such as a laptop computer of the content provider. The slicer 610 can also run on a remote machine to which the media content is uploaded.

The plurality of slices pass from the slicer 610 to the one or more encoders 620. The encoders 620 collectively work to produce the encoded slices and the boundary marker metadata for the encoded slices. For example, a different encoder 620 may retrieve a slice, encode the slice, generate the associated metadata, and store the encoded slice with the metadata to storage 630. Multiple encoders 620 may be used to encode a media asset at different bit rates or quality settings.

In some embodiments, the server 640 receives the different URLs for requesting media content over the network 650 from media players executing on the client computing systems (referred to above as users). The server 640 retrieves the encoded slices of the original media content from the storage 630 and dynamically replaces any slices based on the boundary markers and associated control data before serving a mix of the original media content and substitute content as described in the embodiments above. The client and the server 640, which may be executed on a server of a content delivery network, may be coupled by the network 650.

The network 650 may include any digital public or private network. The client may be a client workstation, a server, a computer, a portable electronic device, an entertainment system configured to communicate over a network, such as a set-top box, a digital receiver, a digital television, a mobile phone, or other electronic devices. For example, portable electronic devices may include, but are not limited to, cellular phones, portable gaming systems, portable computing devices, or the like. The server 640 may be a network appliance, a gateway, a personal computer, a desktop computer, a workstation, etc.

Although shown in FIG. 6 as a distributed system of slicers, encoders, and servers, the media generation system of some embodiments can be a standalone machine. In some such embodiments, the media generation system produces the original media asset encoded slices or has access to those slices, whether the encoded slices are stored on local or remote storage. In other words, a computing device can be special purposed to perform the dynamic content replacement based on the boundary markers as long as the device has access to the encoded slices that form the original media content.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
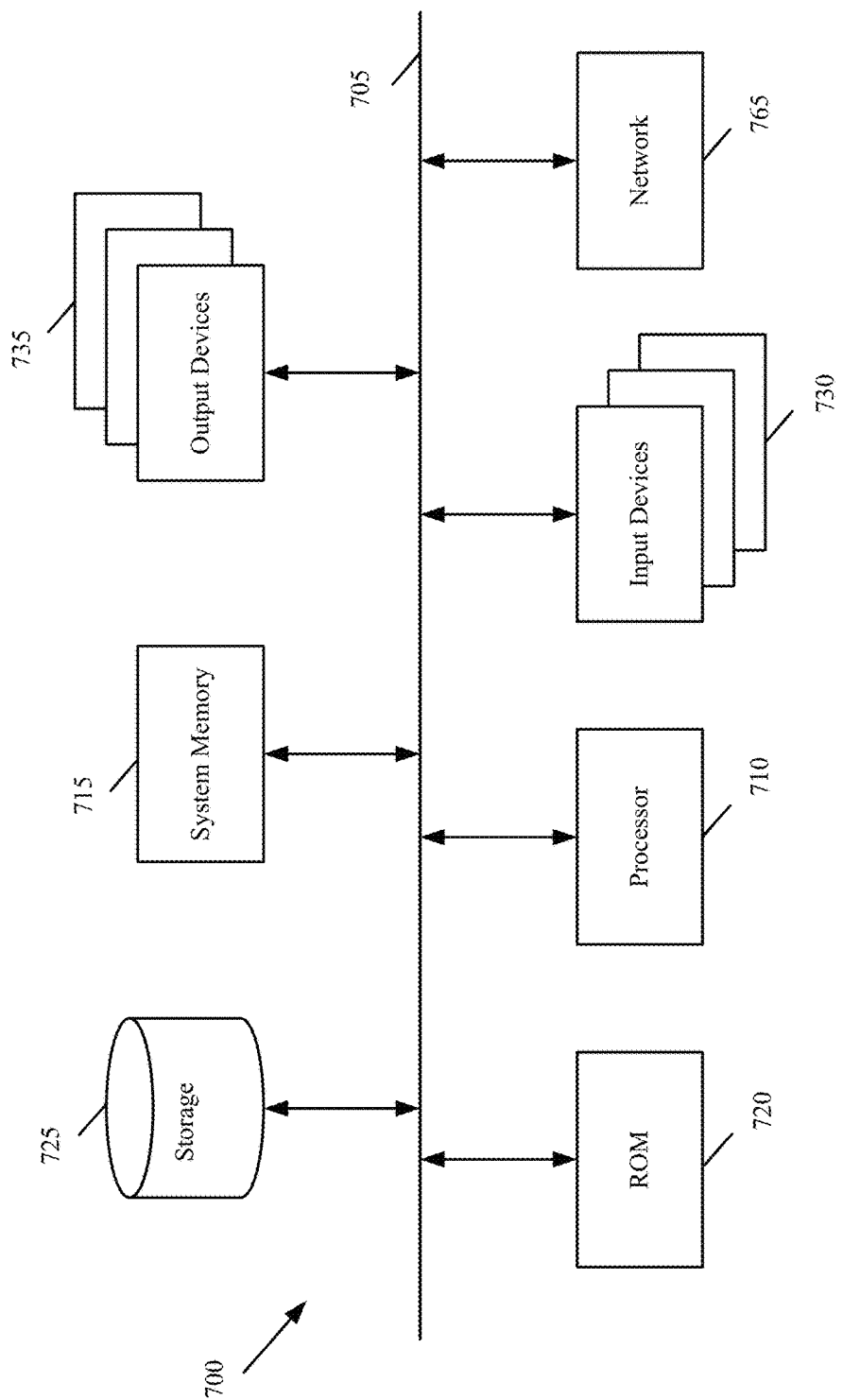
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., media generation system). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments use a mass-storage device (such as a magnetic, solid-state, or optical disk) as the permanent storage device 725.

Other embodiments use a removable storage device (such as a flash drive) as the permanent storage device like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
adding start and end markers at different points of media content, wherein the media content comprises at least a first media segment, encoding a first set of frames, before said start marker and a second media segment, encoding a second set of frames, between said start and end markers, and wherein the start marker is associated with a particular type definition;
receiving a first client request for said media content from a client device, the first client request comprising a type definition and a first value associated with the type definition;
beginning streaming of the media content to the client device in response to the client request by serving the first media segment;
detecting the start marker in the media content and the particular type definition associated with the start marker matching the type definition from the client request; and
continuing said streaming of the media content to the client device by serving a third media segment, as a substitute for the second media segment, in response to the matching of the type definition of the first client request with the particular type definition associated with the start marker triggering substitution of the second media segment, and said first value of the first client request being used in selecting the third media segment.

2. The method of claim 1, wherein each of the first media segment, the second media segment, and the third media segment comprises at least two different video frames.

3. The method of claim 1 further comprising receiving a second client request comprising the request type definition matching the particular type definition associated with the start marker, and a different second value associated with the type definition.

4. The method of claim 3 further comprising serving over the digital network in response to the second client request, the first media segment and a fourth media segment as a substitute for the second media segment based on matching the type definition of the second client request with the particular type definition associated with the start marker, and further based on said second value associated with the type definition of the second request being used in selecting the fourth media segment.

5. The method of claim 3, wherein the media content further comprises a fourth media segment immediately following the second media segment after the end marker, and the method further comprising serving over the digital network in response to the second client request, the first media segment immediately followed by the fourth media segment with the second media segment removed based on said second value associated with the type definition of the second request specifying removal of the second media segment from the media content.

6. The method of claim 1, wherein the second media segment is an original advertisement presented with an original presentation of the media content, and the third media segment is a new advertisement selected based on a time at which the media content is replayed in response to said receiving.

7. The method of claim 1, wherein the first client request comprises (i) a Uniform Resource Locator (URL) linking to said media content, and (ii) URL query string parameters specifying the type definition and the first value associated with the type definition.

8. The method of claim 1, wherein said adding comprises entering the start marker as first metadata at a first time in the media content, and entering the end marker as second metadata at a later second time in the media content.

9. The method of claim 1 further comprising receiving at a different time than said receiving the first client request, a second client request comprising the type definition matching the particular type definition associated with the first marker and said value associated with the type definition, and serving over the digital network in response to the second client request, the first media segment and the second media segment without modification, wherein the first value comprises a condition that is not satisfied upon receiving the second client request and that is satisfied upon receiving the first client request.

10. A method comprising:
    generating media content comprising a first media segment, a second media segment, and a third media segment;
    defining a first boundary spanning a start and an end of said second media segment with a particular identifier that is used to trigger an action associated with the first boundary in a client request for the media content;
    receiving from a client device, a client request comprising a link to the media content, the particular identifier for triggering an action associated with the first boundary, and a parameter associated with the particular identifier, the parameter triggering over the first boundary one of a retain action, a replace action, or an ignore action; and
    modifying the media content provided in response to the client request based on the parameter associated with the particular identifier in the client request, wherein said modifying comprises:
        sending to the client device, the first media segment, the second media segment, and the third media segment unmodified in response to the parameter of the client request having a first value triggering the retain action;
        sending to the client device, the first media segment, a different fourth media segment as a substitute for the second media segment, and the third media segment in response to the parameter of the client request having a different second value triggering the replace action; and
        sending to the client device, the first media segment and the third media segment without the second media segment in response to the parameter of the client request having a different third value triggering the ignore action.

11. The method of claim 10 further comprising retrieving the different fourth media segment from an external server based on the second value of said parameter.

12. The method of claim 10 further comprising selecting the fourth media segment from a plurality of substitute media segments based on the second value of said parameter, and selecting a fifth media segment from the plurality of substitute media segments based on a fourth value of said parameter triggering the replace action.

13. The method of claim 10 further comprising changing client access to the media content by distributing to a plurality of clients, a URL linking to the media content and comprising the particular identifier and the parameter with the first value during a first time interval, and by further distributing to the plurality of clients, said URL linking to the media content and comprising the particular identifier and the parameter with one of the second value or the third value during a second time interval after the first time interval.

14. The method of claim 10, wherein said generating comprises encoding the media content as a plurality of slices, wherein each slice of the plurality of slices encodes a sub-duration of the media content, and wherein the plurality of slices comprises at least a first set of slices encoding the first media segment, a second set of slices encoding the second media segment, and a third set of slices encoding the third media segment.

15. The method of claim 14, wherein sending the first media segment, the fourth media segment as a substitute for the second media segment, and the third media segment comprises sending the first set of slices from said encoding, a different fourth set of slices generated from encoding the fourth media segment, and the third set of slices from said encoding.

16. The method of claim 14, wherein a last slice of the first set of slices encodes a duration past the start of the first boundary, and wherein said defining comprises reencoding said last slice as a first slice and as a second slice, the first slice encoding a duration from a start of the last slice to the start of the first boundary, the second slice encoding a duration from the start of the first boundary to the end of the last slice, the first slice replacing the last slice in the first set of slices, the second slice prepending to the second set of slices.

17. A method comprising:
adding start and end markers at different points of media content, wherein the media content comprises at least a first media segment before said start marker and a second media segment between said start and end markers, and wherein the start marker comprises a particular type definition and a condition;
receiving, from a client device, a client request requesting said media content, the client request comprising a type definition; and
dynamically modifying the media content in response to said condition and said client request, wherein dynamically modifying the media content comprises:
beginning streaming of the media content to the client device by sending the first media segment;
detecting the start marker in the media content, the start marker associated with the particular type definition, and the type definition from the client request matching the particular type definition;
continuing streaming of the media content to the client device by sending the second media segment in response to the condition associated with the start marker being triggered by the type definition of the client request matching the particular type definition, and the condition not being satisfied; and
continuing streaming of the media content to the client device by sending a different third media segment as a substitute for the second media segment in response to the condition associated with the start marker being triggered by the type definition of the client request matching the particular type definition, and the condition being satisfied.

18. The method of claim 17 further comprising tracking satisfaction of said condition based on elapsed time from an original presentation of the media content.

19. The method of claim 17, wherein dynamically modifying the media content further comprises replacing the second media segment between the start and end markers with the third media segment obtained from an advertisement server in response to the condition being satisfied.

* * * * *